(12) United States Patent  (10) Patent No.: US 8,807,445 B2
Ribadeneira et al.  (45) Date of Patent: Aug. 19, 2014

(54) AUXILIARY HEATER PUMP CONTROL

(75) Inventors: Marcelo X. Ribadeneira, Clawson, MI (US); Lawrence P. Ziehr, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1558 days.

(21) Appl. No.: 12/402,581

(22) Filed: Mar. 12, 2009

(65) Prior Publication Data

US 2010/0230505 A1 Sep. 16, 2010

(51) Int. Cl.
*B60H 1/00* (2006.01)
*B60H 1/03* (2006.01)

(52) U.S. Cl.
CPC ............... *B60H 1/004* (2013.01); *B60H 1/034* (2013.01); *F01P 2060/08* (2013.01)
USPC .................... 237/2 B; 237/5; 237/34; 700/276

(58) Field of Classification Search
USPC .................................. 237/2 B, 5, 34; 700/276
See application file for complete search history.

(56) References Cited

U.S. PATENT DOCUMENTS

| | | | |
|---|---|---|---|
| 4,259,722 A * | 3/1981 | Iwata et al. ..................... 701/36 |
| 4,591,691 A * | 5/1986 | Badali ............................ 219/202 |
| 4,770,134 A * | 9/1988 | Foreman et al. ........ 123/142.5 R |
| 4,905,893 A * | 3/1990 | Kiskis ............................. 237/2 A |
| 5,012,070 A * | 4/1991 | Reed ............................... 219/202 |
| 5,174,254 A * | 12/1992 | Humburg ............... 123/142.5 R |
| 5,211,333 A * | 5/1993 | Schmalenbach et al. ..... 237/2 A |
| 5,433,266 A * | 7/1995 | Doi et al. ....................... 165/202 |
| 5,467,006 A * | 11/1995 | Sims ................................... 237/5 |
| 6,598,671 B1 * | 7/2003 | Zeng et al. ..................... 165/240 |
| 6,729,390 B1 * | 5/2004 | Toth et al. ...................... 165/242 |
| 6,782,945 B1 * | 8/2004 | Eisenhour ...................... 165/203 |
| 7,614,368 B2 * | 11/2009 | Gehres et al. .............. 123/41.08 |
| 7,735,744 B2 * | 6/2010 | Eisenhour ................ 237/12.3 B |
| 7,793,856 B2 * | 9/2010 | Hernandez et al. ...... 237/12.3 B |

(Continued)

FOREIGN PATENT DOCUMENTS

DE 3839307 A1 5/1990
DE 4333411 A1 3/1994

(Continued)

OTHER PUBLICATIONS

Lindeburg, Mechanical Engineering Reference Manual, Eight Ed., Professional Publications, 1990, p. 3-2.*
Lindeburg, Mechanical Engineering Reference Manual, Eight Ed., Professional Publications, 1990, p. 6-7.*

*Primary Examiner* — Kang Hu
*Assistant Examiner* — Phillip E Decker

(57) ABSTRACT

A method of auxiliary heater pump control in a vehicle including a heater core and an auxiliary pump in a heater core branch of a vehicle coolant system is disclosed. The method comprises the steps of: determining if a power plant is on, the power plant being connected to the coolant system; calculating an estimated heating power required to meet HVAC system heating requirements that is a function of mass air flow, specific heat, and a change in temperature in a passenger compartment; determining if the calculated estimated heating power required is greater than a minimum required heating power that will be able to maintain thermal comfort in the passenger compartment of the vehicle; and if the calculated estimated heating power required is greater than the minimum required heating power and the power plant is not on, activating the auxiliary pump to pump a coolant through the heater core.

10 Claims, 2 Drawing Sheets

(56) References Cited

U.S. PATENT DOCUMENTS

| | | | |
|---|---|---|---|
| 2003/0079873 A1* | 5/2003 | Kuroda | 165/202 |
| 2006/0157576 A1* | 7/2006 | Eisenhour | 237/28 |
| 2007/0063062 A1* | 3/2007 | Hernandez et al. | 237/12.3 B |
| 2009/0008464 A1* | 1/2009 | Gerhardt et al. | 237/5 |
| 2009/0031741 A1* | 2/2009 | Hara et al. | 62/239 |
| 2009/0301702 A1* | 12/2009 | Zeigler et al. | 165/202 |
| 2010/0131152 A1* | 5/2010 | Castonguay et al. | 701/36 |

FOREIGN PATENT DOCUMENTS

| | | | | |
|---|---|---|---|---|
| DE | 19643492 A1 | * | 4/1998 | |
| DE | 19643492 A1 | * | 4/1998 | |
| DE | 10238277 A1 | | 3/2003 | |
| DE | 10221999 A1 | | 11/2003 | |
| DE | 102007005632 A1 | | 7/2008 | |
| JP | 10103744 A | * | 4/1998 | F24F 11/02 |
| JP | 2009011062 A | * | 1/2009 | |

* cited by examiner

AUXILIARY HEATER PUMP CONTROL

BACKGROUND OF INVENTION

The present invention relates generally to electric vehicles, such as fuel cell vehicles, and hybrid-electric vehicles, and more particularly to heating, ventilation and air conditioning (HVAC) systems and methods of operating such systems in these vehicles.

Advanced automotive vehicles are being introduced that employ fuel cells and hybrid-electric powertrains where there is no internal combustion engine or one that only operates intermittently during vehicle operation. In conventional vehicles, the internal combustion engine operates continuously, so the engine can be used not just to propel the vehicle, but as an ancillary power source, heat source, etc. for other vehicle systems. With some of the advanced automotive vehicles, then, alternative ways of efficiently providing the ancillary functions, while minimizing the cost, complexity, weight and packaging space, are needed.

SUMMARY OF INVENTION

An embodiment contemplates a method of auxiliary heater pump control in a vehicle including a heater core and an auxiliary pump in a heater core branch of a vehicle coolant system, the method comprising the steps of: determining if a power plant is on, the power plant being connected to the coolant system; calculating an estimated heating power required to meet HVAC system heating requirements that is a function of mass air flow, specific heat, and a change in temperature in a passenger compartment; determining if the calculated estimated heating power required is greater than a minimum required heating power that will be able to maintain thermal comfort in the passenger compartment of the vehicle; and if the calculated estimated heating power required is greater than the minimum required heating power and the power plant is not on, activating the auxiliary pump to pump a coolant through the heater core.

An advantage of an embodiment is that fuel economy of the vehicle may be improved by optimizing energy used for HVAC heating. Additionally, the HVAC blower may be employed to mask the auxiliary pump noise during engine off operation.

DETAILED DESCRIPTION

Figure 1:
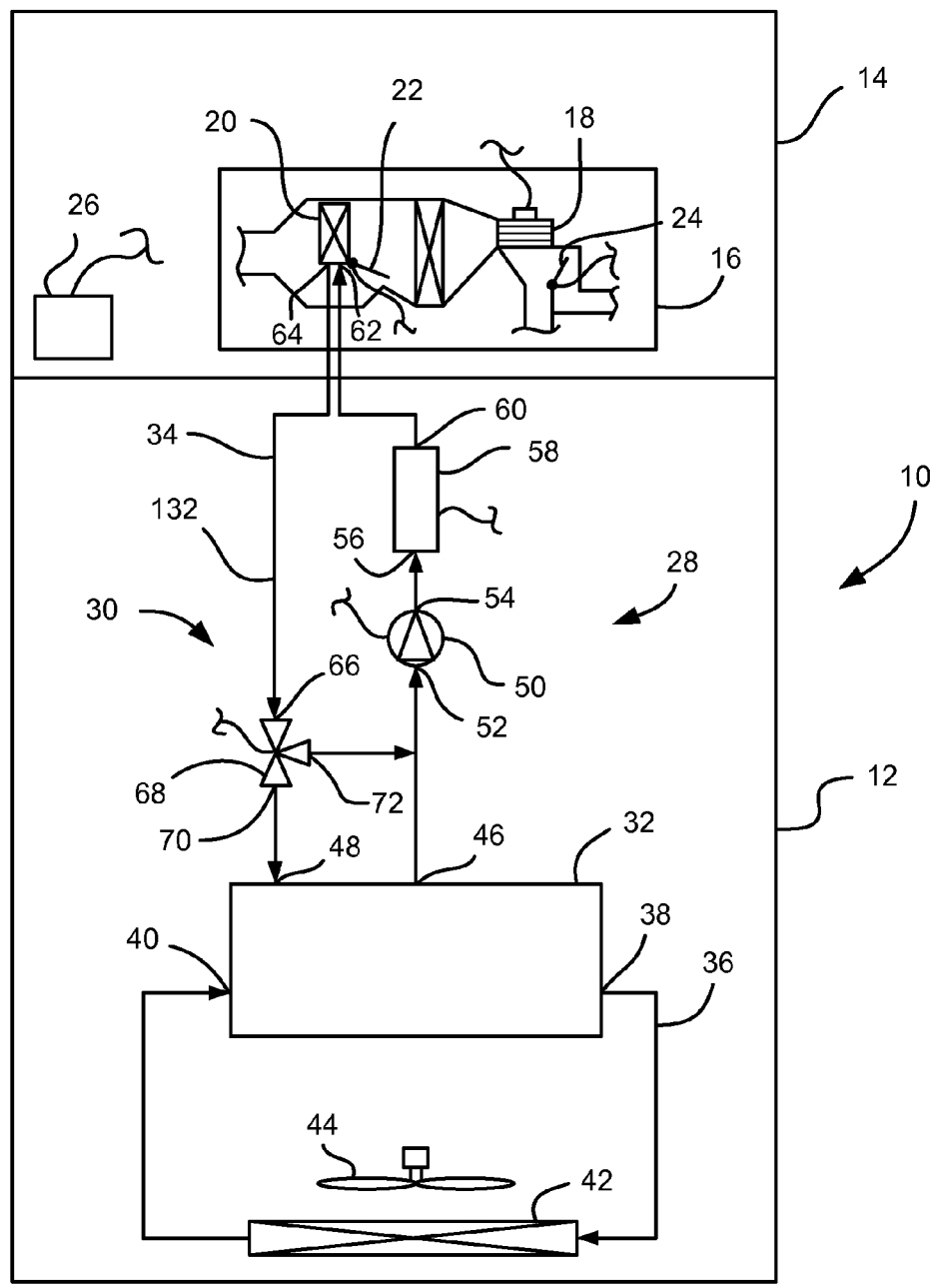
FIG. 1 is a schematic illustration of portions of a vehicle.

Referring to FIG. 1, a vehicle, indicated generally at 10, is shown. The vehicle 10 may include an engine compartment 12 and a passenger/cargo compartment 14. A heating, ventilation and air conditioning (HVAC) module 16 may be located in and provide heating and cooling for the passenger/cargo compartment 14. The HVAC module 16 may include a blower 18 for causing air flow through the module 16, a heater core 20, used to selectively warm the air flowing through the module 16, a temperature blend door 22, which is adjustable to proportionally direct the air through or around the heater core 20, and a fresh air/recirculation door 24 for adjusting the proportion of recirculated and fresh outside air entering the HVAC module 16. The blower 18, temperature blend door 22 and fresh air/recirculation door 24 may be controlled by a heating, ventilation and air conditioning (HVAC) controller 26.

The heater core 20 is also part of a vehicle coolant system 28 having a coolant circuit 30. The coolant in the circuit 30 may be a conventional liquid mixture such as an ethylene glycol and water mix, or may be some other type of liquid with suitable heat transfer characteristics. Solid lines with arrows indicate coolant lines and the direction that coolant may flow through the lines under various operating modes. The coolant circuit 30 has a first branch 34 that includes the heater core 20. The coolant circuit 30 is not only used to supply warm coolant to the heater core 20 for warming the passenger compartment 14, but is also used for warming or cooling a power plant 32, such as an internal combustion engine or a fuel cell stack. This creates a second branch 36 of the coolant circuit 30.

The second branch 36 may include a radiator coolant outlet 38 from the power plant 32 that directs coolant to a radiator 42, and a radiator coolant inlet 40 to the power plant 32 that receives the coolant from the radiator 42. An engine fan 44 may be employed adjacent to the radiator 42 to increase air flow through the radiator 42 to improve heat removal from the coolant. The second branch 36 may also include a radiator bypass (not shown) configured in a more conventional fashion employing a thermostat (not shown). Also, a water pump (not shown) that pumps the coolant through the power plant 32 and second branch 36 may be engine driven or electrically driven, depending upon the particular type of power plant employed.

The first branch 34 of the coolant circuit 30 may include a heater coolant outlet 46 from the power plant 32 and a heater coolant inlet 48 to the power plant 32. An auxiliary electric pump 50 has an inlet 52 that may receive coolant from the heater coolant outlet 46 and an outlet 54 that connects to an inlet 56 to an auxiliary electric coolant heater 58. The auxiliary electric pump 50 can be activated to selectively pump coolant through the first branch 34, and the auxiliary electric coolant heater 58 can be activated to selectively heat the coolant flowing through the first branch 34. An outlet 60 of the coolant heater 58 connects to an inlet 62 to the heater core 20. An outlet 64 from the heater core connects with an inlet 66 to a three-way valve 68. A first outlet 70 of the three-way valve 68 connects to the heater coolant inlet 48 of the power plant 32 while a second outlet 72 of the three-way valve connects to the inlet 52 of the auxiliary electric pump 50. Thus, when the three-way valve 68 is switched to a first position, the coolant flow of the first branch 34 will include the power plant 32, and when the three-way valve 68 is switched to a second position, the coolant flow of the first branch 34 will bypass the power plant 32. Bypassing the power plant 32 may be desirable when the coolant in the power plant 32 is not warmed up. In such an operating condition, the coolant flowing in the first branch 34 that is warmed by the auxiliary electric coolant heater 58 is retained in that branch in order to maximize the heat provided to the heater core 20.

The HVAC controller 26 may control the operation of the auxiliary electric pump 50, auxiliary electric coolant heater 58, and the three-way valve 68.

Figure 2:
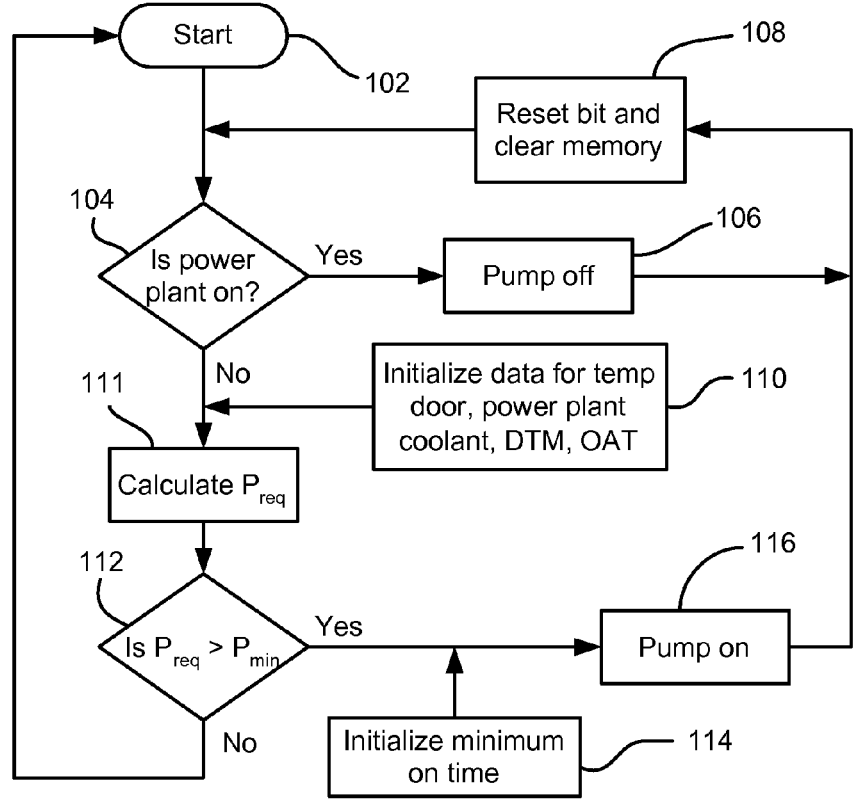
FIG. 2 is a flow chart illustrating a method for heater pump control.

FIG. 2 illustrates a method of operation that may be employed with the vehicle coolant system 28 of FIG. 1 or with other similar types of vehicle coolant and HVAC systems. The method may be employed in various types of auxiliary heating circuits, such as those used with various types of electric hybrid and fuel cell vehicles. The method is employed to determine when the auxiliary pump is needed to operate and under what conditions it can remain off, even when the power plant is not operating.

After auxiliary electric pump control start, block 102, a determination is made as to whether the power plant is on (i.e., operating), block 104. If it is, then the auxiliary electric pump is set to off, block 106, and a bit is reset and the memory is cleared, block 108, before returning to block 104.

If the power plant is off, then data is initialized for the temperature door position (temp door), the power plant coolant temperature (power plant coolant), the duct temperature maintenance (DTM), and the outside air temperature (OAT), block 110. The estimated heating power required ($P_{req}$) is then calculated, block 111. The determination of $P_{req}$ is discussed relative to FIG. 3. Once determined, $P_{req}$ is then compared to a minimum heating power requirement ($P_{min}$), block 112. $P_{min}$ is the minimum required heating power that will be able to maintain thermal comfort in the passenger compartment 14. If $P_{req}$ is not greater than $P_{min}$, then the process returns to start, block 102. However, if $P_{req}$ is greater than $P_{min}$, then pump calibration is started and a minimum on-time is initialized, block 114. The auxiliary pump 50 is turned on, block 116, and a bit is reset and the memory is cleared, block 108, before returning to block 104. Alternatively, the process in block 116 turns on both the auxiliary pump 50 and the auxiliary coolant heater 58.

Figure 3:
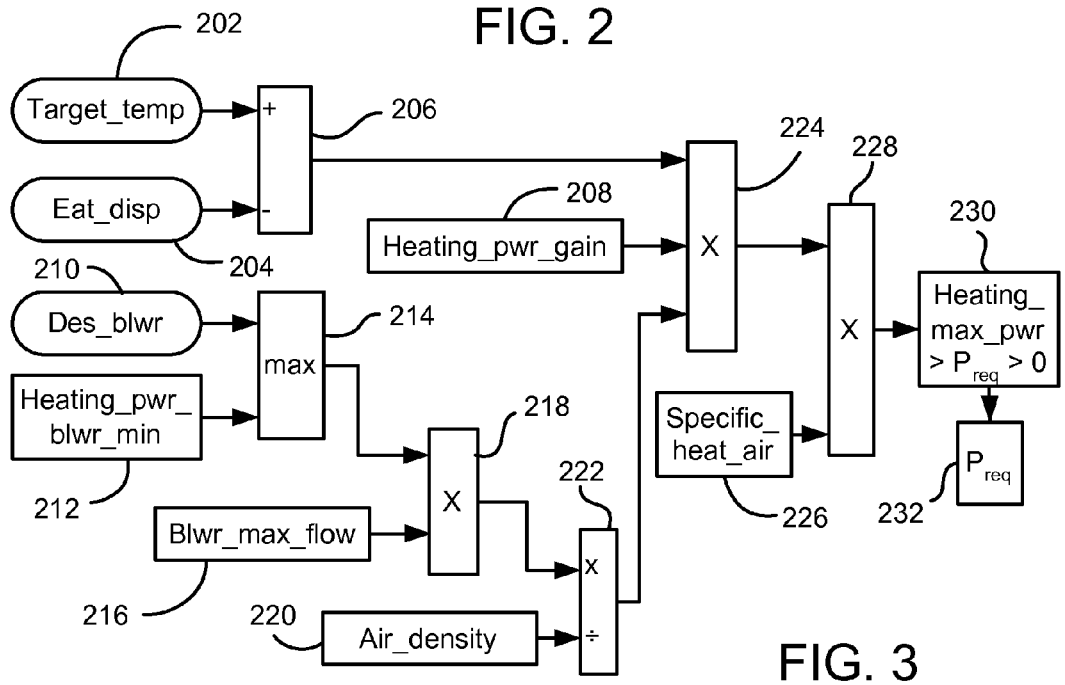
FIG. 3 is a schematic diagram illustrating a process for determining estimated heating power required.

FIG. 3 illustrates a method for determining the estimated heating power required ($P_{req}$) for use in block 111 of the method of FIG. 2. In general $P_{req}=(m_{dot})(C_p)(\Delta T)$, where $m_{dot}$ is the mass air flow, which is a function of the blower speed, $C_p$ is specific heat, and $\Delta T$ is a change in temperature in the passenger compartment, which is a function of the engine coolant temperature, duct temperature maintenance (DTM+k1), outside air temperature ($OAT_{PT}$) and other factors.

More specifically, $P_{req}$ is calculated by employing the following method illustrated in FIG. 3. A target evaporator temperature (eat_disp), block 204, is subtracted from a target temperature (target_temp), block 202, with the result, block 206, input to block 224. A heat factor (heating_pwr_gain), block 208, is also input to block 224. A desired blower power (des_blwr), block 210, is compare to a minimum blower power (heating_pwr_blwr_min), block 212, and the maximum of these power input values to the blower is chosen, block 214, and output to block 218. A blower conversion factor (blwr_max_flow), block 216, is multiplied by the output of block 214 (block 218) to convert a blower power into an air flow volume, and then this air flow volume is output to block 222. This input to block 222 is divided by an air density value (air_density), block 220, and input to block 224. The three inputs to block 224 are multiplied and the result is output to block 228. This input to block 228 is multiplied by a specific heat of air (specific_heat_air), block 226, and the result is output to block 230 as an initial $P_{req}$. This initial value of Preq is limited to between a minimum value of 0 and a maximum value of a maximum heat power capability (heating_max_pwr), block 230, resulting in the final calculated value for $P_{req}$, block 232. This calculated value of $P_{req}$ resulting from the method of FIG. 3, is the $P_{req}$ obtained in block 111 in FIG. 2, which is then employed in the decision block 112 of FIG. 2.

While certain embodiments of the present invention have been described in detail, those familiar with the art to which this invention relates will recognize various alternative designs and embodiments for practicing the invention as defined by the following claims.

What is claimed is:

1. A method of auxiliary heater pump control in a vehicle including a heater core and an auxiliary pump in a heater core branch of a vehicle coolant system when the power plant is not on, the method comprising the steps of:
    (a) calculating, with a controller, an estimated heating power required to provide heat to a passenger compartment that is a function of a mass air flow, a specific heat, and a change in temperature in the passenger compartment, the change in temperature in the passenger compartment being a function of a coolant temperature in the coolant system and an outside air temperature;
    (b) determining, with the controller, if the calculated estimated heating power required is greater than a minimum required heating power that will be able to maintain a thermal range in the passenger compartment;
    (c) if the calculated estimated heating power required is greater than the minimum required heating power, activating the auxiliary pump to pump the coolant through the heater core; and
    (d) when the auxiliary pump is activated, setting a minimum blower power for a blower forcing air through the heater core, whereby noise from the auxiliary pump is masked by noise from the blower.

2. The method of claim 1 wherein step (c) is further defined by activating an auxiliary coolant heater in the heater core branch if the calculated estimated heating power required is greater than the minimum required heating power.

3. The method of claim 1 wherein step (c) is further defined by initializing a predetermined minimum auxiliary pump on-time when activating the auxiliary pump and maintaining the auxiliary pump on for at least the predetermined minimum auxiliary pump on-time.

4. The method of claim 1 further comprising deactivating the auxiliary pump prior to step (a) if the power plant is on.

5. The method of claim 1 wherein step (a) is further defined by determining a maximum value between a desired blower power and the minimum blower power for the blower forcing air through the heater core, and multiplying this maximum value by a blower conversion factor that converts a blower power into an air flow volume to get an air flow value, and then dividing the air flow value by an air density value to determine the mass air flow.

6. The method of claim 1 wherein step (a) is further defined by subtracting a target evaporator temperature from a target temperature and multiplying by a heat gain factor to determine the change in temperature.

7. The method of claim 1 wherein the power plant is an internal combustion engine.

8. A method of auxiliary heater pump control in a vehicle including a heater core and an auxiliary pump in a heater core branch of a vehicle coolant system when the power plant is not on, the method comprising the steps of:
    (a) calculating, with a controller, an estimated heating power required to provide heat to a passenger compartment that is a function of a mass air flow, and a specific heat;
    (b) determining, with a controller, if the calculated estimated heating power required is greater than a minimum required heating power that will be able to maintain a thermal range in the passenger compartment;
    (c) if the calculated estimated heating power required is greater than the minimum required heating power, activating the auxiliary pump to pump the coolant through the heater core and activating an auxiliary coolant heater in the heater core branch to warm the coolant flowing through the auxiliary pump;

(d) initializing a predetermined minimum auxiliary pump on-time when activating the auxiliary pump and maintaining the auxiliary pump on for at least the predetermined minimum auxiliary pump on-time; and (e) when the auxiliary pump is activated, setting a minimum blower power for a blower forcing air through the heater core, whereby noise from the auxiliary pump is masked by noise from the blower.

9. The method of claim 8 further comprising deactivating the auxiliary pump prior to step (a) if the power plant is on.

10. The method of claim 8 wherein step (a) is further defined by determining a maximum value between a desired blower power and the minimum blower power for the blower forcing air through the heater core, and multiplying this maximum value by a blower conversion factor that converts a blower power into an air flow volume to get an air flow value, and then dividing the air flow value by an air density value to determine the mass air flow.

\* \* \* \* \*